United States Patent
Sheng (10) Patent No.: US 9,258,834 B2
(45) Date of Patent: Feb. 9, 2016

(54) METHOD OF MOBILE TERMINAL INTERNAL COMMUNICATIONS

(71) Applicant: SPREADTRUM COMMUNICATIONS (SHANGHAI) CO., LTD., Shanghai (CN)

(72) Inventor: Yanxin Sheng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 116 days.

(21) Appl. No.: 14/129,634

(22) PCT Filed: Sep. 5, 2013

(86) PCT No.: PCT/CN2013/082985
§ 371 (c)(1),
(2) Date: Dec. 27, 2013

(87) PCT Pub. No.: WO2015/032048
PCT Pub. Date: Mar. 12, 2015

(65) Prior Publication Data
US 2015/0201436 A1 Jul. 16, 2015

(51) Int. Cl.
*H04B 1/40* (2015.01)
*H04W 76/02* (2009.01)
*H04B 1/00* (2006.01)
*H04L 25/02* (2006.01)

(52) U.S. Cl.
CPC ............. *H04W 76/02* (2013.01); *H04B 1/0028* (2013.01); *H04L 25/02* (2013.01); *Y02B 60/50* (2013.01)

(58) Field of Classification Search
CPC ........ H04W 76/02; H04L 25/02; H04B 1/401
USPC .................. 455/39, 511, 515, 68, 73, 84, 130, 455/161.3
See application file for complete search history.

(56) References Cited

U.S. PATENT DOCUMENTS

2007/0270108 A1* 11/2007 Kim et al. ....................... 455/91
2013/0044832 A1* 2/2013 Zheng ........................... 375/260

FOREIGN PATENT DOCUMENTS

CN 102264045 A 11/2011
CN 103220822 A 7/2013

* cited by examiner

*Primary Examiner* — Tuan Pham
(74) *Attorney, Agent, or Firm* — Terry M. Sanks, Esq.; Beusse Wolter Sanks & Maire, PLLC (57) ABSTRACT

The present invention discloses a method of mobile terminal internal communications, which belongs to the field of mobile communications. The method comprises: a control signal channel is connected within an application processor module and a baseband processor module, and the control signal channel is composed of a first signal channel, a second signal channel and a feedback channel. A first request signal is sent from the application processor module to the baseband processor module via the first signal channel, and then a feedback is sent from the baseband processor module to the application processor module via the feedback channel. After the feedback is sent to the application processor module, the application processor module starts to send data to the baseband processor module. A second request signal is sent from the baseband processor module to the application processor module, and then the baseband processor module starts to send data to the application processor module.

21 Claims, 10 Drawing Sheets

METHOD OF MOBILE TERMINAL INTERNAL COMMUNICATIONS

TECHNICAL FIELD

The present invention relates to technical field of mobile communications, more specifically, to a method of mobile terminal internal communications.

BACKGROUND OF THE INVENTION

In the prior art, an AP+Modem solution is generally used for internal transmission of the mobile communication terminal.

The AP of the prior art generally refers to Application Processor. The application processor is a Grand Scale Integration (GSI) which extends the function of audio and video (AV) and the special interfaces based on a low-power CPU. The application processor is used to control several functional programs of the mobile communication terminal, such as taking photos, displaying photographs, playing music, and playing videos, and so on. Therefore, the function of the conventional mobile phone is extended other than phone calling and message sending.

The Modem in the prior art generally refers to a Baseband Processor which is equivalent to a protocol processor. The conventional baseband processor is mainly used as the operate control codes of the communication protocol control layer and for controlling the upper software of the communication protocol.

The traditional method of AP+Modem communication comprises providing a communication connection between the AP and the Modem by several connecting lines, using at least four signal transmission lines for achieving a handshake mechanism, and then establishing a connection between the AP and the Modem.

Likewise, it is necessary for the Modem to send data to the AP which requires at least four signal transmission lines, using a handshake mechanism by the transmission lines, and then establishing a connection between the AP and the Modem. More signal transmission lines, chip pins, and power consumption of the system are required through the above mentioned connection types. The above mentioned connection types may also limits the speed of data transmission due to the long-time handshaking.

The Chinese Patent Publication No. CN103220822A discloses a data transmission method, a data transmission device and a mobile terminal, belonging to the field of a terminal technology. The method comprises the steps of receiving a data transfer instruction used for transmitting an appointed file through first terminal equipment; detecting a sound state of the first terminal equipment, and generating appointed handshaking information according to the sound state; transmitting the appointed handshaking information through the first terminal equipment according to the appointed file to enable second terminal equipment and the first terminal equipment to establish data connection according to the appointed handshaking information; and transmitting the appointed file to the second terminal equipment through the data connection between the first terminal equipment and the second terminal equipment. Although the technical solution the above mentioned the handshake mechanism therein, it is not clear enough for the detail thereof. Hence, the technical solution can not overcome the defects in the prior art.

The Chinese Patent Publication No. CN102264045A discloses a method for achieving handshaking in the instant message process. The mobile terminal achieves the handshaking between the instant messaging client and the instant messaging server by using the handshaking message. And the handshaking message between the instant messaging client and the instant messaging server consists in data packages of the control channel message in the wireless communication. The patent has also disclosed a system for achieving handshaking in the instant message process. Accordingly, the above technical solution does not relate to the exact signal transmission process of the handshake mechanism, which can not overcome the defect in the prior art.

SUMMARY OF THE INVENTION

Due to the defects existing in the prior art, i.e., there are lots of signal connection lines between the AP and the Modem, which resulted in long time communication connection, lower transmission rate, waste of hardware resources and power consumption of the system. A method of mobile terminal internal communications is disclosed, comprising: applying to a mobile terminal, wherein the mobile terminal comprises an application processor module, a baseband processor module, a control signal channel which is configured between the application processor module and the baseband processor module, wherein the control signal channel is composed of a first signal channel, a second signal channel and a feedback channel;

Sending a first request signal from the application processor module to the baseband processor module via the first signal channel through which the application processor module requests for sending data; and sending a feedback signal from the baseband processor module to the application processor module via the feedback channel through which the baseband processor module is prepared for receiving data, the application processor module sending data to the baseband processor module after receiving the feedback signal;

Sending a second request signal from the baseband processor module to the application processor module via the second signal channel through which the application processor module requests for sending data; and then the baseband processor module sending data to the application processor module.

Preferably, the method of mobile terminal internal communications, wherein the steps of the application processor module sending data to the baseband processor module as follows:

Step a1, sending the first request signal from the application processor module to the baseband processor module via the first signal channel;

Step a2, sending the feedback signal from the baseband processor module to the application processor module via the feedback channel;

Step a3, sending data from the application processor module to the baseband processor module;

Step a4, accomplishing the data transmission by the application processor module, and then exiting.

Preferably, the method of mobile terminal internal communications, wherein in Step a1, it determines the operating state of the baseband processor module at first;

Step a11, determining whether a SDIO (Secure Digital Input and Output) interface of the baseband processor module is in an idle state;

If the SDIO interface is in the idle state, then it shifts to Step a12;

If the SDIO interface is not in the idle state, then a failing request signal of the application processor module is send back and then exit;

Step a12, determining whether the baseband processor module is in data receiving state;

If the baseband processor module is not in the data receiving state, then shift to Step a13;

If the baseband processor module is in data receiving state, the application processor module is waiting until the data is received by the baseband processor module, and then shift to Step a13;

Step a13, determining whether the baseband processor module is in data sending state;

If the baseband processor module is not in data sending state, then continue to execute Step a1;

If the baseband processor module is in the data sending state, the application processor module is waiting until the data is received by the baseband processor module, then continues to execute Step a1.

Preferably, the method of mobile terminal internal communications, wherein in Step a2, it determines the operating state of the baseband processor module when the baseband processor module receives the first request signal and, If the baseband processor module is in data sending state, the baseband processor module is waiting until the data is sent, then the baseband processor module sends the feedback signal to the application processor module via the feedback channel;

If the baseband processor module is not in data sending state, the baseband processor module directly sends the feedback signal to the application processor module via the feedback channel;

Preferably, the method of mobile terminal internal communications, wherein in Step a4, when the data is sent to the baseband processor module by the application processor module, update the operating state of the application processor module to the data sending state.

Preferably, the method of mobile terminal internal communications, wherein in Step a5, when the data has been sent to the baseband processor module by the application processor module, updates the operating state of the application processor module to the idle state.

Preferably, the method of mobile terminal internal communications, wherein the sending data by the baseband processor module comprises steps of:

Step b1, reading the data from the application processor module by the baseband processor module through a first data buffer area; and then it sends the feedback signal from the baseband processor module to the application processor module via the feedback channel;

Step b2, reading the data from the first data buffer area by the baseband processor module after the data is received by the first data buffer area;

Step b3, determining whether a transmit queue of the baseband processor module is empty;

If the transmit queue is not empty, then the data is sent by the baseband processor module;

If the transmit queue is empty, then exit the process.

Preferably, the method of mobile terminal internal communications, wherein in Step b1, determine whether the SDIO interface of the baseband processor module is in the idle state;

If the SDIO interface is in the idle state, then continue to execute Step b1;

If the SDIO interface is not in the idle state, then it determine whether the SDIO interface can read data after the data has been sent by the baseband processor module;

If the SDIO interface can read data, then continue to execute Step b1;

If the SDIO interface can not read data, then update the operating state of the baseband processor module to the data sending state, and then shift to the Step b3.

Preferably, the method of mobile terminal internal communications, wherein in Step b2, the baseband processor module updates the operating state of the baseband processor module to the data receiving state after the data has been read by the first data buffer area, and then starts to read data from the first data buffer area.

Preferably, the method of mobile terminal internal communications, wherein in Step b2, the baseband processor module adopts a multiplexer to read data from the first data buffer area.

Preferably, the method of mobile terminal internal communications, wherein the baseband processor module sending data to the application processor module comprises the steps of:

Step c1, sending the data to the application processor module by the baseband processor module;

Step c2, sending the second request signal from the baseband processor module to the application processor module via the second signal channel;

Step c3, accomplishing the data sending process of the baseband processor module, and then exiting the process.

Preferably, the method of mobile terminal internal communications, wherein in Step c1, determine whether a bus is in the idle state, Step c11, sending the data to a second data buffer area by the baseband processor module, and then packaging the data to fit the SDIO interface;

Step c12, determining whether the bus is in the idle state;

Step c13, keeping the second request signal waiting by the baseband processor module until the bus is in the idle state;

Step c14, executing the Step c1 when the bus is in the idle state.

Preferably, the method of mobile terminal internal communications, wherein in Step c2, the baseband processor module updates the operating state to the data sending state when it sends the second request signal.

Preferably, the method of mobile terminal internal communications, wherein in Step c3, determining whether the duration of sending data of the baseband processor module exceeds a default time interval comprises the steps of:

Step c31, if the duration of sending of the baseband processor module does not exceed the default time interval, eliminating the sent data from the transmission queue of the baseband processor module, and then shifting to Step c32;

if the duration of sending data of the baseband processor module exceeds the default time interval, and then shifting to Step c32;

Step c32, determining whether the transmission queue is empty;

If the transmission queue is not empty, then return to Step c1.

If the transmission queue is empty, then exit the process.

Preferably, the method of mobile terminal internal communications, wherein in Step c31, update the operating state of the baseband processor module to the data sending finishing state.

Preferably, the method of mobile terminal internal communications, wherein in Step c3, it update the operating state of the baseband processor module to the idle state.

Preferably, the method of mobile terminal internal communications, wherein the application processor module receiving data from the baseband processor module comprises the steps of:

Step d1, Starting to receive the data by the application processor module;

Step d2, Accomplishing the step of receiving data by the application module, and then exiting.

Preferably, the method of mobile terminal internal communications, wherein in Step d1, updates the operating state of the application processor module to the data receiving state.

Preferably, the method of mobile terminal internal communications, wherein initiate a first detection mechanism when the baseband processor module receives data; and the first detection mechanism comprises the steps of:

Step e1, receiving a data package by the SDIO interface;

Step e2, detecting the data package by the SDIO interface, and then determining the detection result;

If the data package has errors, then shift to Step e3;

If the data package has no error, then shift to Step e4;

Step e3, the baseband processor module dropping the data package which has errors, and then returning to Step e1;

Step e4, determining whether the data package is the last data package in the data receiving process by the SDIO interface;

If the data package is the last data package in the data receiving process, then exit;

If the data package is not the last data package in the data receiving process, then return to Step e1.

Preferably, the method of mobile terminal internal communications, wherein in Step e4, the SDIO interface sends a first resend signal to the application processor module, the first resend signal requests the application processor module to resend the data package which has errors;

the application processor module resends the corresponding data package to the baseband processor module after the application processor module has received the first resend signal.

Preferably, the method of mobile terminal internal communications, wherein initiate a second detection mechanism when the application processor module receives the data;

the second detection mechanism comprises the steps of:

Step f1, receiving a data package by the application processor module;

Step f2, detecting the data package by the application processor module, and then determining the detected result;

If the data package has errors, then shift to Step f3;

If the data package has no error, then shifts to Step f5;

Step f3, sending a second resend signal from the application processor module to the baseband processor module;

Step f4, resending the data package which has errors to the application processor module after the baseband processor module has received the second resend signal; and then return to Step f1;

Step f5, determining whether the data package is the last package in the data transmission process by the application processor module;

If the data package is the last data package in the data receiving process, then exit the process;

If the data package is not the last data package in the data receiving process, then return to Step f1.

The advantageous effects of the above technical solution are as follow,

1) Reducing connection lines in the communication so as to reduce the number of pins in the chips and to save the hardware resources of the system;

2) Reducing connection lines in communication so as to reduce the power consumption of the system;

3) Reducing connection lines in communication so as to shorten the process of communication connection, and to improve data transmission rate;

4) Adding the process of data resending judgment and request so as to improve safety and reliability of the data transmission.

DESCRIPTIONS OF THE PREFERRED EMBODIMENTS

The present invention will be further illustrated in combination with the following figures and embodiments, but it should not be deemed as limitation of the present invention.

Figure 1:
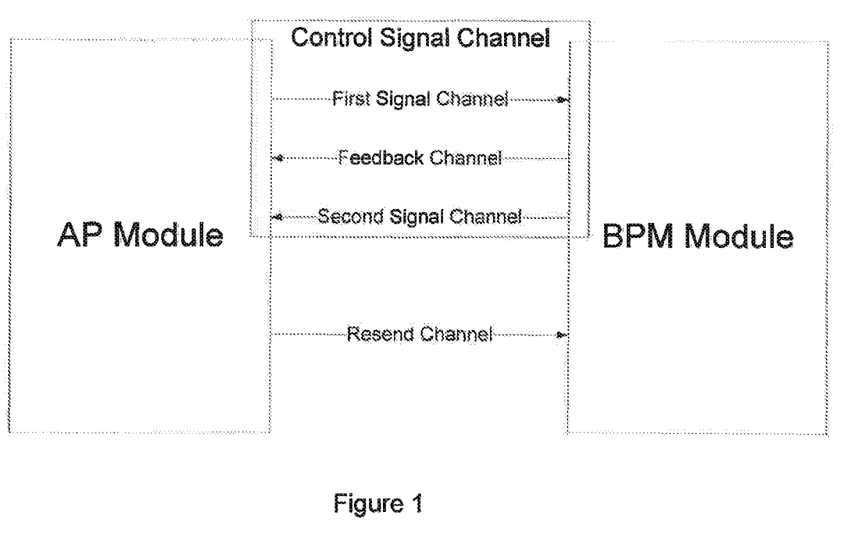
FIG. 1 is a block diagram of the basic structure to achieve the method in the embodiment of the invention.

In the embodiment of the present invention, as referred in FIG. 1, the mobile terminal comprises an application processor module (AP module) and a baseband processor module (BPM module). A control signal channel is provided to connect with the AP module and the BPM module. The control signal channel is composed of three sub-channels which are a first signal channel, a second signal channel and a feedback channel. The three sub-channels are three individual hardware signal lines. In other words, the main idea of the invention includes achieving the handshaking between the AP module and the BPM module via the three hardware signal lines so as to reduce the expenses of the chip pins and other hardware resources of the system.

When the data is required to be sent to the BPM module by the AP module, the AP module firstly sends a first request signal via the first signal channel through which the application processor module requests for sending data. When the BPM module receives the first request signal and then it shifts into the read state, the BPM module sends a feedback signal to the AP module. The feedback signal is used to respond the request of data transmission. After AP module receiving the feedback signal, the AP module establishes a connection with the BPM module, and then sends data to the BPM module via a data transmission line.

When the data is required to be sent to the AP module by the BPM module, the BPM module sends a second request signal to the AP module via the second signal channel. Next, the BPM module establishes a connection with the AP module, and sends data to the AP module via the data transmission line.

When the AP module finds the received data package has errors, the AP module then sends a resend signal (AP Resend) to the BPM module via an additional resend channel.

Figure 2:
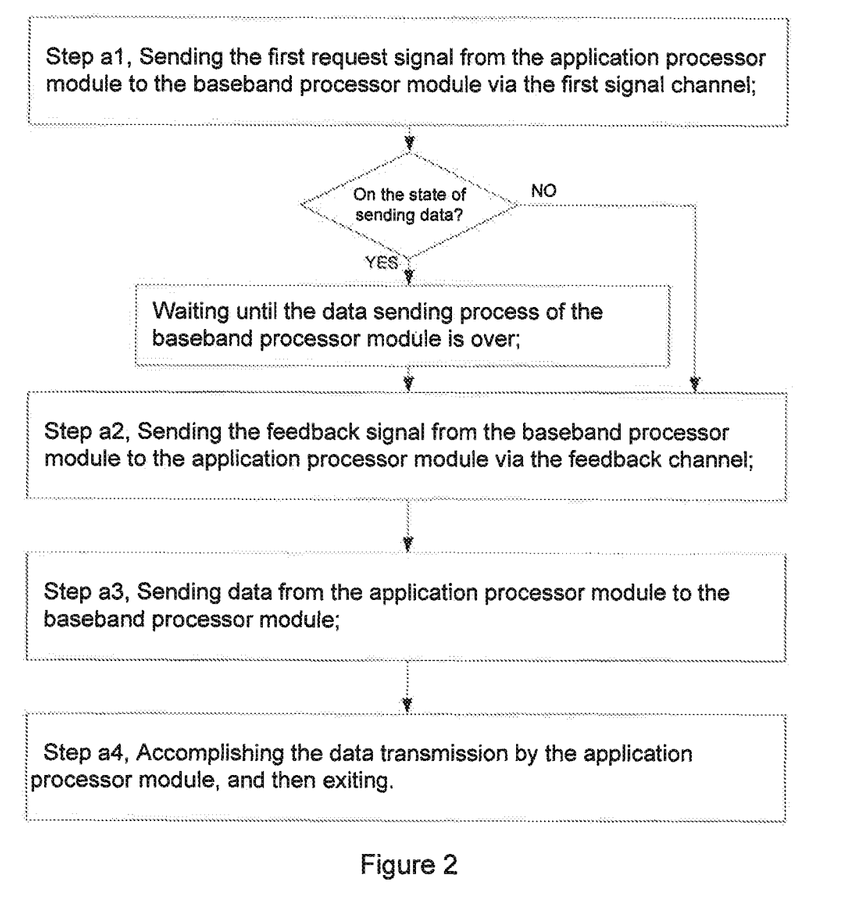
FIGS. 2-3 are flow charts for the AP module sending data to the BPM module in the embodiment of the invention.

FIG. 2 shows a process of the AP module sending data to the BPM module in an embodiment of the invention, Step a1, the application module sends a first request signal to the baseband processor module via a first signal channel;

Step a2, the baseband processor module sends a feedback signal to the application processor module via a feedback channel;

In the embodiment, Before the BPM module sending the feedback signal, the BPM module firstly determines the operating state thereof;

If the BPM module is in the SENDING state, the data is deemed to be sent by the BPM module; then the BPM module sends the feedback signal to the AP module after the BPM module finishing sending data. The feedback signal means the BPM module is ready. If the BPM module is not in the data sending state, the BPM module directly sends the feedback signal to the AP module via the feedback channel.

Step a3, the application processor module sends data to the baseband processor module;

Step a4, the application processor module finishes data transmission process, and then it exits the process.

In the embodiment of the invention, when the AP module finishes the data transmission process, the state thereof is updated to an idle state, so as to get ready for the next data sending or receiving.

Figure 3:
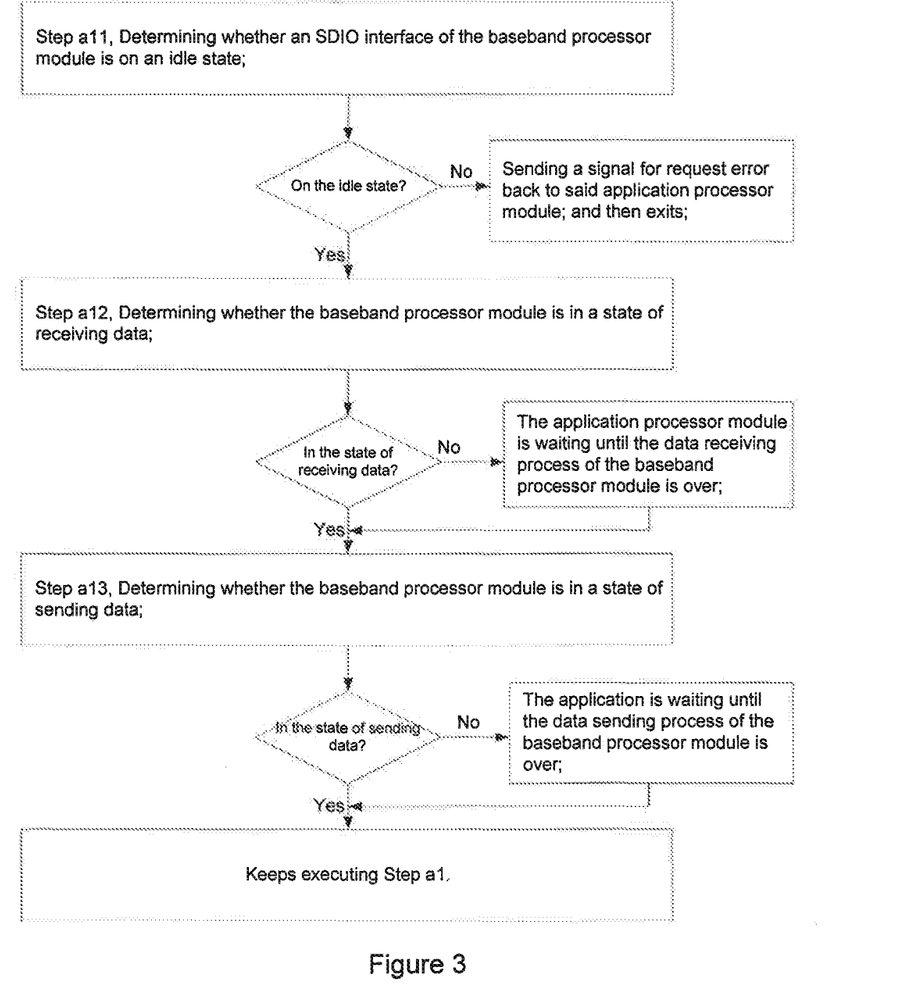

In the embodiment of the invention, more specifically, in the Step a1, firstly determines the operating state of the baseband processor module. FIG. 3 shows a process of determining the operating state of the baseband processor module as follows, initiating the data sending process by the application processor module. Step a11, determining whether the SDIO interface of the baseband processor module is in the idle state;

If the SDIO interface is in the idle state, then shift to Step a12;

If the SDIO interface is not in the idle state, then a signal of request error is send back to the application processor module;

In the embodiment of the invention, if the state of the SDIO interface is ready, then the state of the SDIO interface can be considered as in the idle state, otherwise the feedback signal, which means the connection request is failed, is returned to the AP module, and then it exits the process.

Step a12, determining whether the baseband processor module is in the data receiving state;

If the baseband processor module is not in the data receiving state, then shift to Step a13;

If the baseband processor module is in the data receiving state, the application processor module is waiting until the data receiving process of the baseband processor module is over, and then shift to Step a13;

In the embodiment of the invention, if the state of the BPM module is receiving, then the BPM module is considered as receiving data. The AP module is waiting until the data receiving process of BPM module is over, and then shift to Step a13.

Step a13, determining whether the baseband processor module is in the data sending state;

If the baseband processor module is not in the data sending state, then continue to execute Step a1;

If the baseband processor module is in the data sending state, the application processor module is waiting until the data sending process of the baseband processor module is over, then continue to execute Step a1.

In the embodiment of the invention, if the BPM module is in the state of sending, then the BPM module is considered as sending data. The AP module is waiting until the data sending process of the BPM module is over, then executes the next step.

Figure 4:
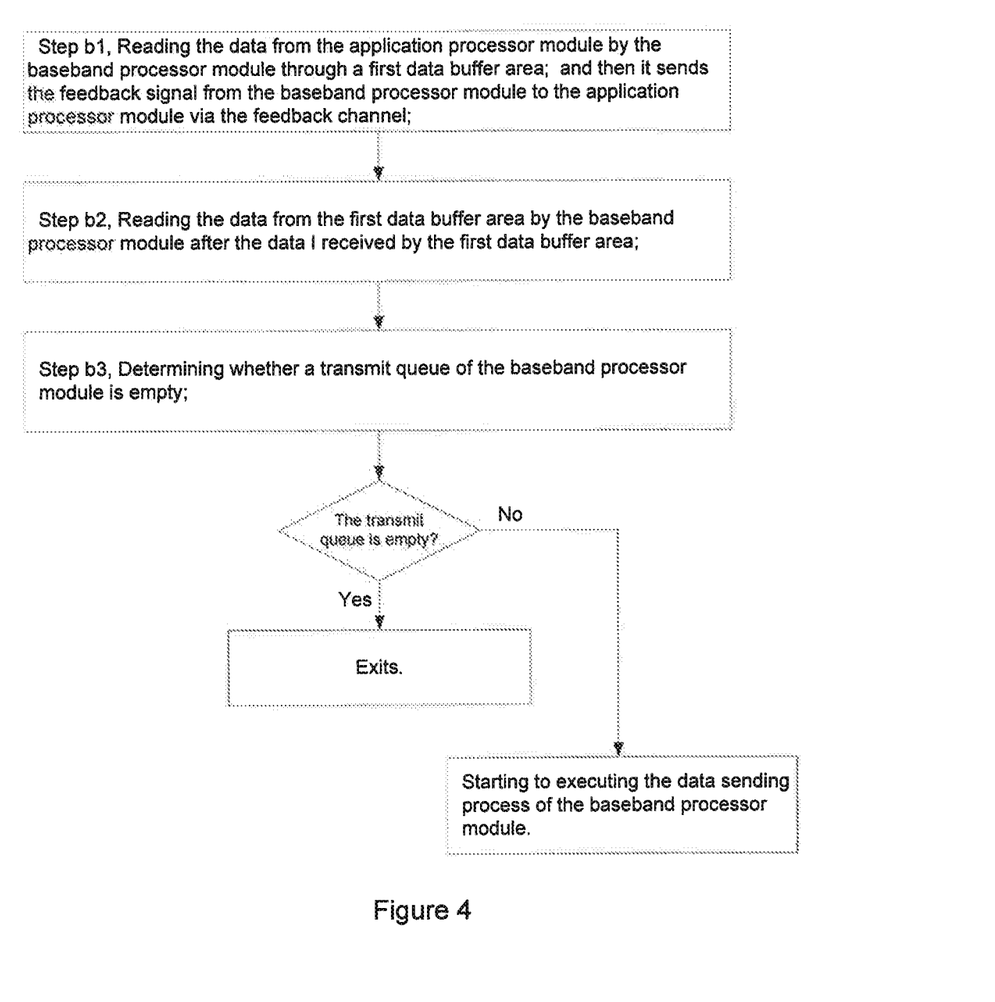
FIGS. 4-5 are flow charts for the BPM module receiving data in the embodiment of the invention.

In the embodiment of the invention, as referred in FIG. 4, there is a data receiving process of the BPM module. Initiating the data receiving process after the data is sent to the BPM module by the AP module comprises the steps of:

Step b1, the data sent from the application processor module is read by the baseband processor module through a first data buffer area; and then the feedback signal is sent from the baseband processor module to the application processor module via the feedback channel.

In the embodiment of the invention, the first data buffer area particularly refers to a Read Buffer. And then the feedback signal is sent from the BPM module to the AP module via the feedback channel. The feedback signal which is sent to the AP module means that the BPM module is ready to read data;

Step b2, the baseband processor module reads data from the first data buffer area after the data receiving process of the first data buffer area is over;

In the embodiment of the invention, after the data receiving process of Read Buffer is over, the BPM module reads the data in Read Buffer via a multiplexer (MUX); simultaneously, the BPM module updates the state thereof to the data receiving state.

Step b3, determining whether a transmit queue of the baseband processor module is empty; if the transmit queue is empty, and then exit the process.

In the embodiment of the invention, if the transmit queue is not empty, and then initial the data sending process of the baseband processor module.

In the embodiment of the invention, in the BPM module, only one operation between the sending data and the receiving data can be chosen to executive at once. Therefore, when there is a conflict between the data sending process and the data receiving process, the data sending process is waiting until the data receiving process is over, due to the higher priority of the data receiving process in general. In this moment, if there is data still in the transmit queue that means the data sending process is held, the BPM module keeps executing the data sending process after exiting from the data receiving process.

Figure 5:
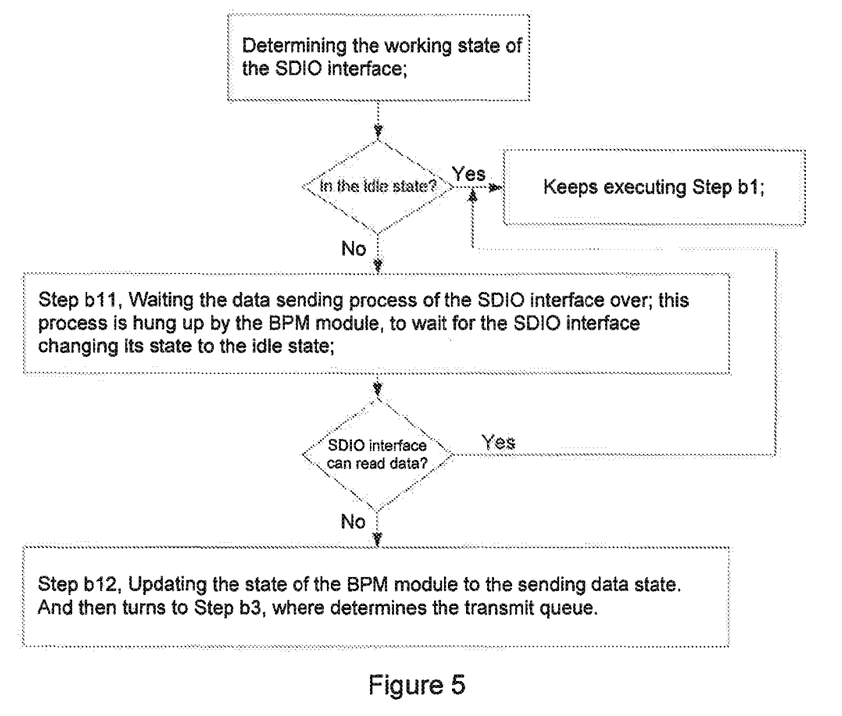

In the embodiment of the invention, in Step b1, firstly determining the operating state of the SDIO interface before the data receiving process of the baseband processor module starts, If the SDIO interface is in the idle state, then continue to execute Step b1;

If the SDIO interface is not in the idle state (in the embodiment of the invention, the SDIO interface is not in the idle state just means the SDIO interface is in data sending state, because the process herein is in the data receiving process of the BPM module), then FIG. 5 shows the process herein, Step b11, waiting until the data sending process of the SDIO interface is over;

In the embodiment of the invention, this process is held by the BPM module, to wait for the SDIO interface changing its state to the idle state; when the data sending action is over, the end event of the data sending process can be used to activate the data receiving event, and keeps executing the next operation.

Next, there is a start to determine whether the SDIO interface can read data;

If the SDIO interface can read data, then shift to Step b1;

If the SDIO interface can not read data yet, then shift to Step b12;

Step b12, the state of the BPM module is updated to the sending data state. And then shift to Step b3, where determines the transmit queue.

Figure 6:
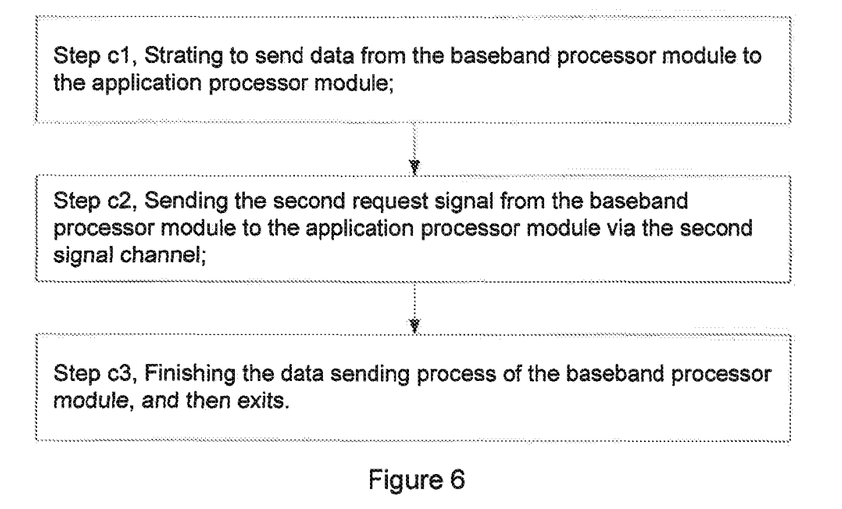
FIGS. 6-8 are flow charts for the BPM module sending data to the AP module in the embodiment of the invention.

FIG. 6 shows a process, of the baseband processor module sending data to the application processor module in the embodiment of the invention, Step c1, the baseband processor module starts to send data to the application processor module;

In the embodiment of the invention, the BPM module sends data to the direct memory access (DMA).

Step c2, the second request signal is sent from the baseband processor module to the application processor module via the second signal channel;

In the embodiment of the invention, when the BPM module is sending data DMA, the BPM module sends the second request signal to the AP module. The second request signal is used to activate the AP module, and to request to send data to the AP module.

In the embodiment of the invention, in Step c2, when the BPM module is sending the second request signal to the AP module, the state of the BPM module is updated to the data sending state.

Step c3, the data sending process of the baseband processor module is over, then this process herein is exited.

Figure 7:
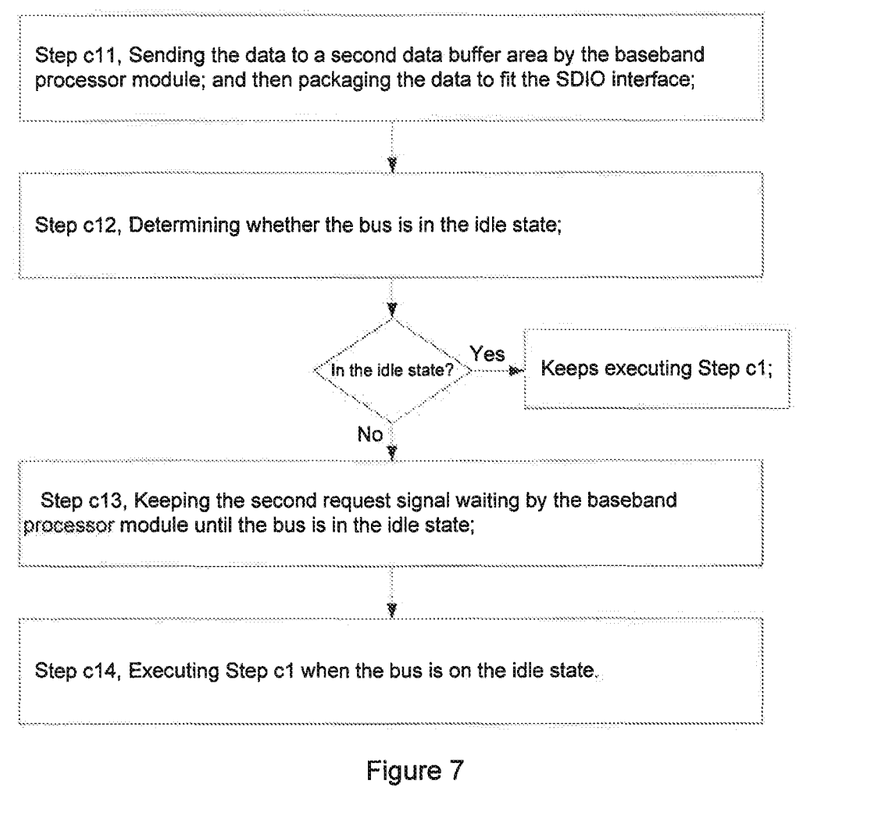

FIG. 7 shows a process in the embodiment of the invention, which in Step c1, of determining the operating state of a bus before the BPM module sending data to DMA, Step c11, the data is sent to a second data buffer area by the baseband processor module; and then the data is packaged to fit the SDIO interface;

In the embodiment of the invention, the second data buffer area is a TX Buffer. The BPM module copies data to TX Buffer, where the data is needed to send. And then the data herein is packaged to fit the SDIO interface, which is called a SDIO Packet.

Step c12, determining whether the bus is in the idle state;

In the embodiment of the invention, if the bus is not in the idle state, then shift to Step c13;

If the bus is in the idle state, then keeps executing Step c1 (in other words the process of the BPM module is starting to send data to DMA).

Step c13, the second request signal is waiting by the baseband processor module, until the bus is in the idle state;

Step c14, Step c1 continues to be executed when the bus is in the idle state.

Figure 8:
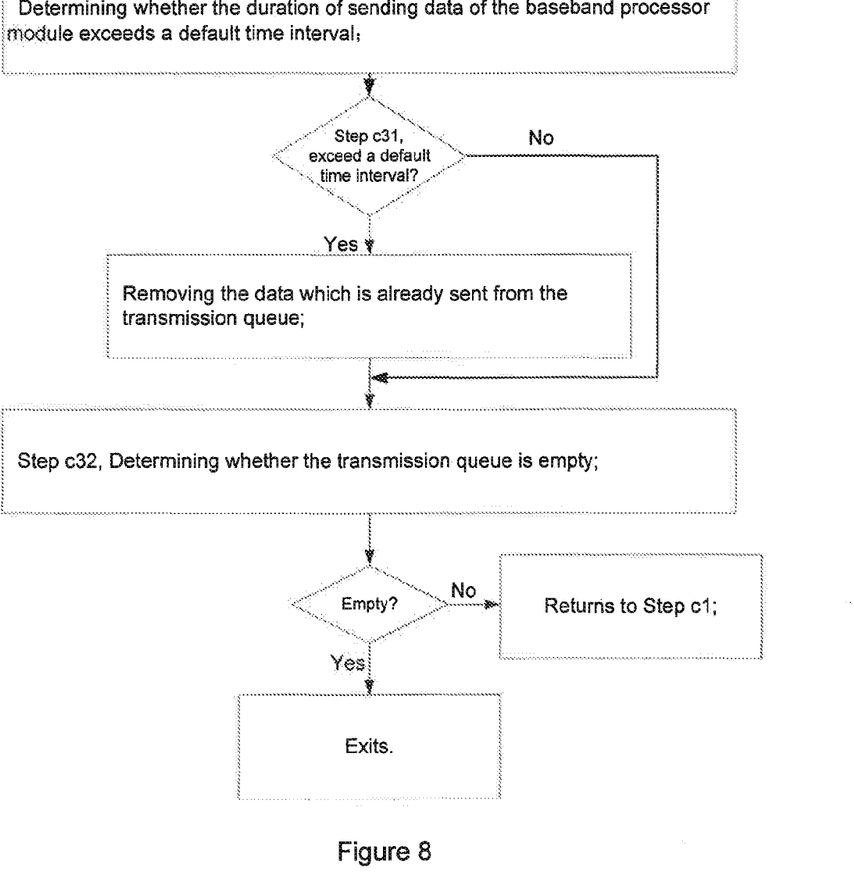

FIG. 8 shows a process in the embodiment of the invention. In this embodiment, a default time interval is set. The process herein is used to prevent the BPM module from blocking the whole data transmission lines for a long time due to duration of sending data. The process herein comprises the steps of:

Step c31, if the duration of sending data of the baseband processor module does not exceed the default time interval, the sent data is removed from the transmission queue; and then shift to Step c32;

If the duration of sending data of the baseband processor module exceeds the default time interval, then directly turn to Step c32;

In the embodiment of the invention, the data to be sent is temporarily stored in a transmission queue in the BPM module; if the BPM module sends a data package in the default time interval, this data package is removed from the transmission queue herein, to avoid the repeated data package sending.

In the embodiment of the invention, the state of the BPM module is updated to the idle state when the BPM module removes data in the transmission queue.

Step c32, determining whether the transmission queue is empty;

In the embodiment of the invention, if the transmission queue is empty, then exit;

If the transmission queue is not empty, which means there is remained data in the BPM module within the range of acceptable sending time; then return to Step c1 by the BPM module for proceeding the data sending.

Figure 9:
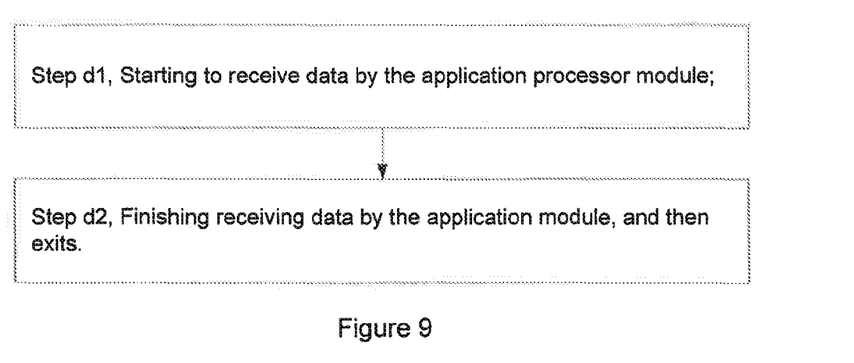
FIG. 9 is a flow chart for the AP module receiving data in the embodiment of the invention.

In the embodiment of the invention, as referred in FIG. 9, a data receiving process in the application processor module including the steps of:

Step d1, the application processor module starts to receive data;

In the embodiment of the invention, when the AP module starts to receive data, the operating state of the AP module is updated to the receiving data state. And the AP module receives data from DMA.

Step d2, this process is exited after the application processor module finishes receiving data.

In the embodiment of the invention, when the AP module finishes receiving data, the operating state of the AP module is updated to the idle state, and then exits the process herein.

There are some data interactions with the BPM module in the process of the AP module, which has transport errors occasionally. The transport errors generally comprise dropping parts of or whole of data packages, or wrong transport order, and so on. Under the traditional AP+Modem mode, verifying the data correctness of data transmission on hardware is usually used to prevent the transport errors, but the traditional method can not offer mechanisms of real-time recovery and conflict reconciliation.

An embodiment of the invention offers a data resend mechanism when a transport error is found by the AP module and the BPM module.

In the embodiment of the invention, defining the data resend mechanism in the BPM module as a first detection mechanism, and defining the data resend mechanism in the AP module as a second detection mechanism.

Figure 10:
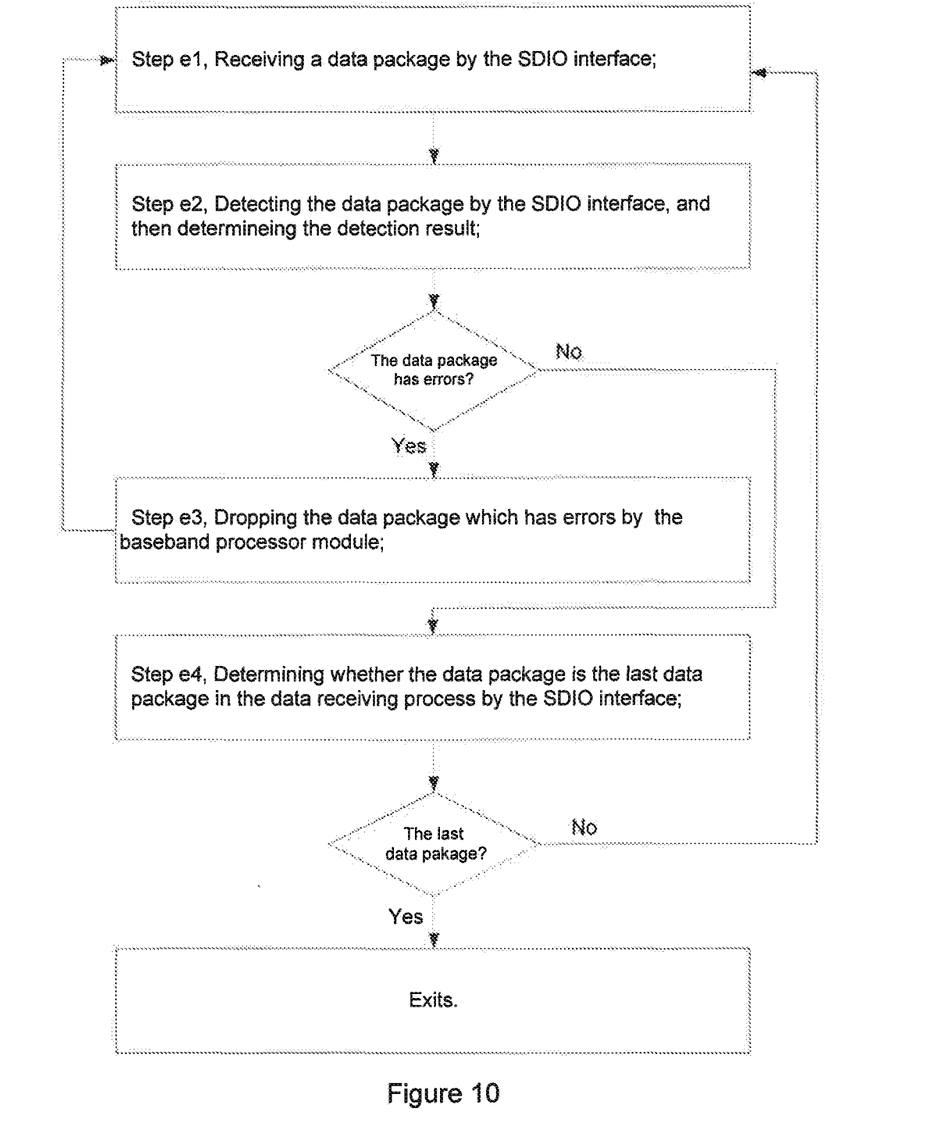
FIG. 10 is a flow chart for the BPM module calibrating data and requesting retransmission in the embodiment of the invention.

FIG. 10 shows the first detection mechanism in the embodiment of the invention comprising:

Step e1, the SDIO interface receives the data package;

Step e2, the SDIO interface detects and determines the data package above;

If the data package has errors, then shift to Step e3;

If the data package has no error, then shift to Step e4;

In the embodiment of the invention, when the SDIO interface detects that the data package has errors, the SDIO interface sends a corresponding notification signal. But there is no need for the BPM module to respond; the BPM module just drops the data package which has errors.

Step e3, the baseband processor module drops the data package which has errors, and then return to Step e1;

Step e4, the SDIO interface determines whether the data package is the last data package in this data receiving process;

If the data package is the last data package in this data receiving process, then exit;

If the data package is not the last data package in this data receiving process, then return to Step e1.

In the better embodiment of the invention, when the SDIO interface sends the notification signal to the BPM module, the SDIO interface sends a first resend signal to the AP module. The first resend signal means a request for resending of the data package which has errors; the AP module resends the corresponding data package to the BPM module after the AP module receives the first resend signal.

Figure 11:
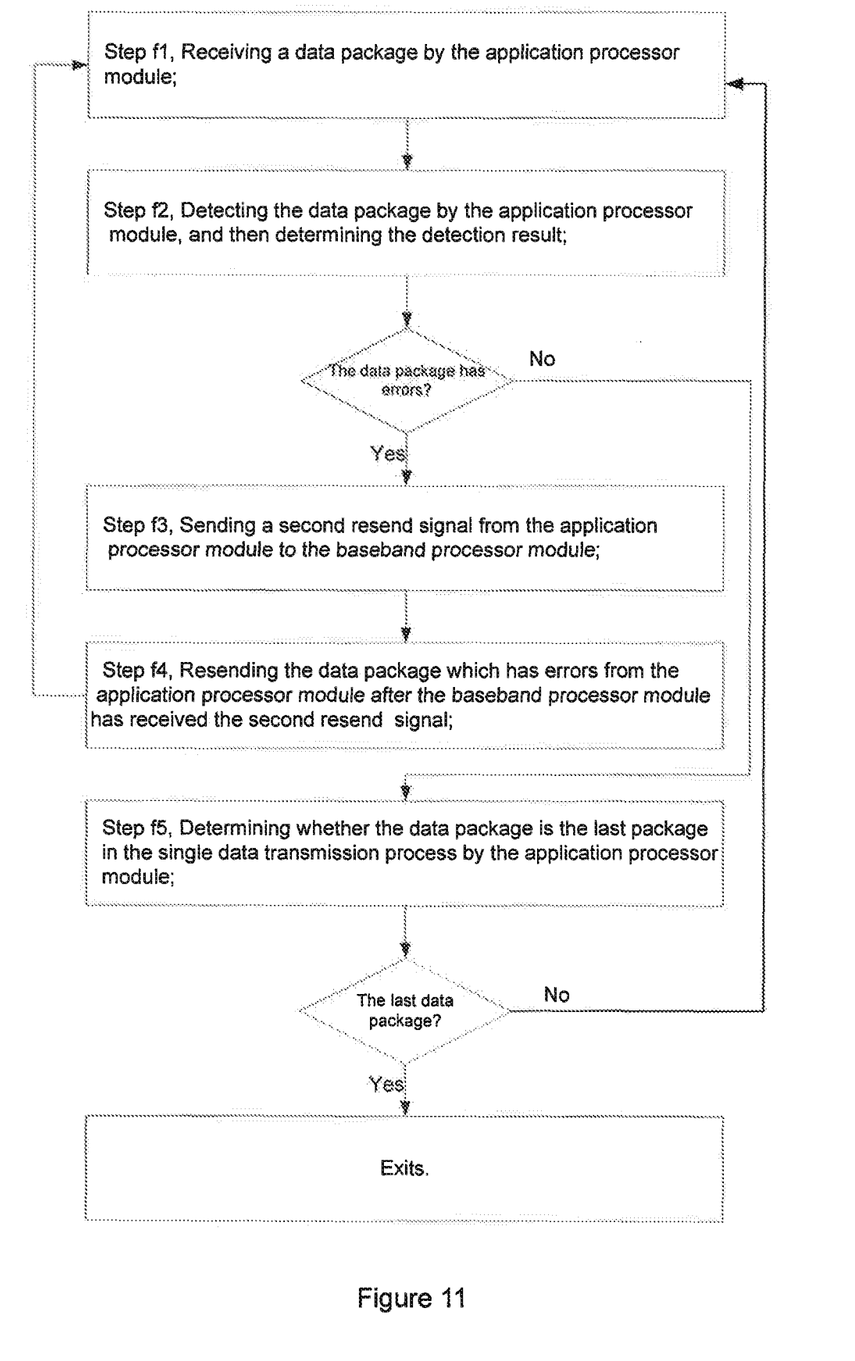
FIG. 11 is a flow chart for the AP module calibrating data and requesting retransmission in the embodiment of the invention.

FIG. 11 shows the second detection mechanism in the embodiment of the invention, it comprises the steps of:

Step f1, the application processor module receives a data package;

Step f2, the application processor module detects and determines the data package;

If the data package has errors, then shift to Step f3;

If the data package has no error, then shift to Step f5;

In the embodiment of the invention, which is different from the first detection mechanism, the detection module in the second detection mechanism is the AP module.

Step f3, a second resend signal is sent from the application processor module to the baseband processor module;

Step f4, the baseband processor module resends the data package which has errors to the application processor module after the baseband processor module receives the second resend signal; and then return to Step f1;

Step f5, the application processor module determines whether the data package is the last package in this data transmission process;

If the data package is the last data package in this data receiving process, then exit;

If the data package is not the last data package in this data receiving process, then return to Step f1.

In the embodiment of the invention, both the first detection mechanism and the second detection mechanism determine whether a data package has errors by detecting a checking-head of the data package (it can be several bits of data in the head of the data package in the embodiment of the invention).

In the embodiment of the invention, a method of interruption to determine whether the data receiving process of the AP module is over, When the data receiving process of the AP module is over, a controller of the SDIO interface of the BPM module generates an interruption. The BPM module determines whether the data receiving process of the AP module is over by interruption time point and the data size which the AP module has received.

Furthermore, the following part combined the sequence chart describes the communication connection mechanism between the AP module and the BPM module.

In the embodiment of the invention, as referred in FIG. 11, when the AP module is sending data to the BPM module, the AP module firstly sends the first request signal, i.e., AP Rts to the BPM module via the first signal channel. The first request signal means a request to BPM module for a connection and sending data. As shown in FIG. 11, high level means the AP Rts is effective, and low level means the AP Rts is void.

When the BPM module receives the AP Rts, a feedback signal i.e., Modem Rdy is sent from the BPM module to the AP module via the feedback channel. The feedback signal means a feedback for the request of the AP module. As shown in FIG. 11, high level means the Modem Rdy is effective, and low level means the Modem Rdy is void.

As shown in FIG. 11, the SDIO Clock is a system clock of the SDIO interface when the AP module is sending data.

Figure 12:
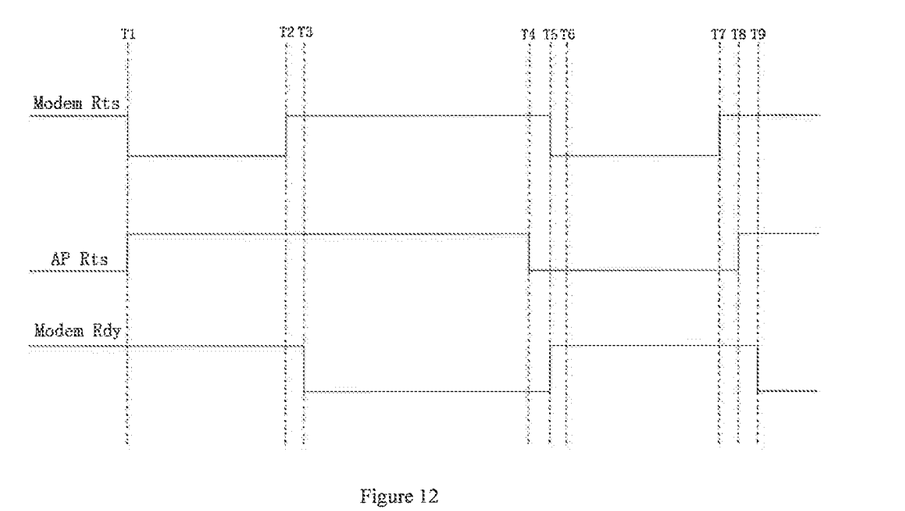
FIG. 12 is a sequence chart for the connection between the AP module and the BPM module in the embodiment of the invention.

FIG. 12 shown in the embodiment of the invention, when the BPM module is sending data to the AP module, a second request signal (Modem Rts) is sent from the BPM module to the AP module via the second signal channel, and then the BPM module establishes a connection with the AP module so as to send signals to the AP module.

As shown in FIG. 12, the SDIO Clock is used as a system clock of the SDIO interface when the AP module is receiving data.

Figure 13:
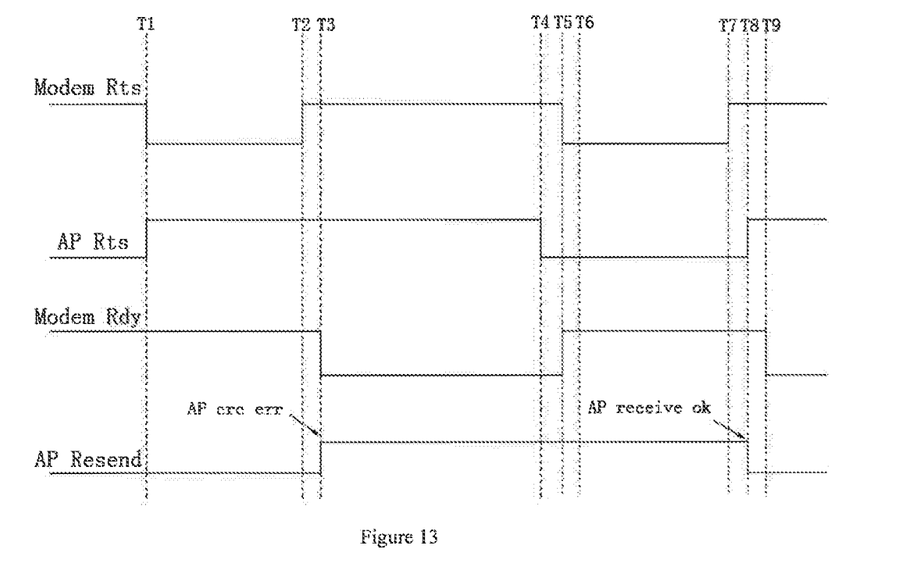
FIG. 13 is a sequence chart for the AP module requesting retransmission in the embodiment of the invention.

FIG. 13 completely shows the data resending conflict resolution of the communication connection between the AP module and the BPM module.

As shown in FIG. 13, low level means the Modem Rts is effective, and high level means the AP Rts is effective; low level means the Modem Rdy is void.

As shown in FIG. 13, T2-T1 is the duration when the BPM module is sending the second request signal (Modem Rts). In the embodiment of the invention, T2-T1<20 ms. As shown in FIG. 10, the AP module and the BPM module sends a request signal, the AP Rts and the Modem Rts, at once. During the duration of T2-T1, the Modem Rts is firstly executed. Therefore, the first request signal (AP Rts) of the AP module is hold. The AP Rts is started to get response until the sending process of the Modem Rts is over, and passing a delay time (T3-T2<1 ms). The AP Rts is being sent until the T4 time (T4-T3<20 ms). And then the BPM module sends the Modem Rts to the AP module after a delay time (T6-T5<1 ms); the Modem Rts is void after a delay time (T7-T6<20 ms); AP Rts is effective after a delay time (T8-T7<ms); And the Modem Rdy is started to be effective after a delay time (T9-T8<1 ms), and so on.

FIG. 14 shows the resend mechanism of the AP module based on FIG. 13, i.e., the above mentioned second detection mechanism comprising:

After the Modem Rts is void, and then it passes a delay time (T3-T2), if the AP module detects the data package which is received with errors, then a second resend signal (AP Resend) is sent from the AP module to the Modem module. In the embodiment of the invention, high level means the AP Resend is effective, in other words, means the AP module sending the AP Resend to the BPM module started from the AP module finding the transport error (AP crc err) to the AP module finishing receiving this data package (AP receive OK). The duration of this AP crc err is T3-T8.

In the embodiment of the invention, there is no need for the BPM module to respond for the data package error, and the BPM module just drops the data package which has errors. Therefore, it is no need to describe the first detection mechanism of the BPM module with sequence charts.

Although a typical embodiment of a particular structure of the specific implementation way has been given with the above description and the figures, it is appreciated that other changes based on the spirit of this invention may also be made. Though the preferred embodiments are proposed above, these contents will never be the limitation of this invention.

It is obvious for the skilled in the art to make varieties of changes and modifications after reading the above descriptions. Hence, the Claims attached should be regarded as all the changes and modifications which cover the real intention and the range of this invention. Any and all equivalent contents and ranges in the range of the Claims should be regarded belonging to the intention and the range of this invention.

The invention claimed is:

1. A method of mobile terminal internal communications, which is applied to a mobile terminal, where the mobile terminal comprises an application processor module, a baseband processor module, a control signal channel which is configured between the application processor module and the baseband processor module, wherein the control signal channel is composed of a first signal channel, a second signal channel and a feedback channel, wherein the first signal channel, the second signal channel and the feedback channel are three individual signal lines; and the method comprising:

sending a first requested signal from the application processor module to the baseband processor module via the first signal channel through which the application processor module requests for sending data; and sending a feedback signal from the baseband processor module to the application processor module via the feedback channel through which the baseband processor module is prepared for receiving data; the application processor module sending data to the baseband processor module after receiving the feedback signal; and sending a second requested signal from the baseband processor module to the application processor module via the second signal channel through which the application processor module requests for sending data; and then the baseband processor module sending data to the application processor module.

2. The method as disclosed in claim 1, wherein the application processor module sending data to the baseband processor module comprises the steps of:

Step a1, sending the first requested signal from the application processor module to the baseband processor module via the first signal channel;

Step a2, sending the feedback signal from the baseband processor module to the application processor module via the feedback channel;

Step a3, sending data from the application processor module to the baseband processor module; and Step a4, accomplishing the data transmission by the application processor module, and then exiting.

3. The method as disclosed in claim 2, wherein in Step a1, it determines the operating state of the baseband processor module at first:

Step a11, determining whether a SDIO (Secure Digital Input and Output) interface of the baseband processor module is in an idle state;

if the SDIO interface is in the idle state, then shift to Step a12;

if the SDIO interface is not in the idle state, then a failing request signal of the application processor module is send back and then exiting;

Step a12, determining whether the baseband processor module is in a data receiving state;

if the baseband processor module is not in the data receiving state, then shifts to Step a13;

if the baseband processor module is in the data receiving state, the application processor module is waiting until the data is received by the baseband processor module, and then shifts to Step a13;

Step a13, determining whether the baseband processor module is in a data sending state;

if the baseband processor module is not in the data sending state, then continue to executes Step a1; and if the baseband processor module is in the data sending state, the application processor module is waiting until the data is received by the baseband processor module, then continue to executes Step a1.

4. The method as disclosed in claim 2, wherein in Step a2, it determines the operating state of the baseband processor module when the baseband processor module receives the first request signal, and if the baseband processor module is in the data sending state, the baseband processor module is waiting until the data is sent, then the baseband processor module sends the feedback signal to the application processor module via the feedback channel; and if the baseband processor module is not in the data sending state, the baseband processor module directly sends the feedback signal to the application processor module via the feedback channel.

5. The method as disclosed in claim 2, wherein in Step a4, when the data is sent to the baseband processor module by the application processor module, update the operating state of the application processor module to the data sending state.

6. The method as disclosed in claim 2, wherein in Step a5, when the data has been sent to the baseband processor module by the application processor module, update the operating state of the application processor module to the idle state.

7. The method as disclosed in claim 1, wherein sending data by the baseband processor module comprises the steps of:

Step b1, reading the data from the application processor module by the baseband processor module through a first data buffer area; and then it sends the feedback signal from the baseband processor module to the application processor module via the feedback channel;

Step b2, reading the data from the first data buffer area by the baseband processor module after the data is received by the first data buffer area;

Step b3, determining whether a transmit queue of the baseband processor module is empty;

if the transmit queue is not empty, then the data is sent by the baseband processor module; and if the transmit queue is empty, then exiting.

8. The method as disclosed in claim 7, wherein in Step b1, determines whether a Secure Digital Input and Output (SDIO) interface of the baseband processor module is in the idle state;

if the SDIO interface is in the idle state, then continue to execute Step b1;

if the SDIO interface is not in the idle state, then determine whether the SDIO interface can read data after the data has been sent by the baseband processor module;

if the SDIO interface can read data, then continue to execute Step b1; and if the SDIO interface can not read data, then updates the operating state of the baseband processor module to the data sending state, and then shift to Step b3.

9. The method as disclosed in claim 8, wherein in Step b2, the baseband processor module updates the operating state of the baseband processor module to the data receiving state after the data has been read by the first data buffer area, and then starts to read data from the first data buffer area.

10. The method as disclosed in claim 1, wherein in Step b2, the baseband processor module adopts a multiplexer to read data from the first data buffer area.

11. The method as disclosed in claim 1, wherein the baseband processor module sending data to the application processor module comprises the steps of:

Step c1, sending the data to the application processor module by the baseband processor module;

Step c2, sending the second request signal from the baseband processor module to the application processor module via the second signal channel; and Step c3, accomplishing the data sending process of the baseband processor module, and then exiting.

12. The method as disclosed in claim 11, wherein in Step c1, determines whether a bus is in the idle state;

Step c11, sending the data to a second data buffer area by the baseband processor module, and then packaging the data to fit the SDIO interface;

Step c12, determining whether the bus is in the idle state;

Step c13, keeping the second request signal waiting by the baseband processor module until the bus is in the idle state; and Step c14, executing Step c1 when the bus is in the idle state.

13. The method as disclosed in claim 11, wherein in Step c2, the baseband processor module updates the operating state to the data sending state when it sends the second request signal.

14. The method as disclosed in claim 11, wherein in Step c3, determining whether the duration of sending data of the baseband processor module exceeds a default time interval comprises the steps of:
- Step c31, if the duration of sending data of the baseband processor module does not exceed the default time interval, eliminating the sent data from the transmission queue of the baseband processor module, and then shifting to Step c32;
- if the duration of sending data of the baseband processor module exceeds the default time interval, and then shifting to Step c32;
- Step c32, determining whether the transmission queue is empty;
- if the transmission queue is not empty, then returns to Step c1; and
- if the transmission queue is empty, then exiting.

15. The method as disclosed in claim 14, wherein in Step c31, updates the operating state of the baseband processor module to the data sending finishing state.

16. The method as disclosed in claim 11, wherein in Step c3, updates the operating state of the baseband processor module to the idle state.

17. The method as disclosed in claim 1, wherein the application processor module receiving data from the baseband processor module comprises the steps of:
- Step d1, starting to receive the data by the application processor module; and
- Step d2, Accomplishing the step of receiving data by the application module, and then exiting.

18. The method as disclosed in claim 17, wherein in Step d1, updates the operating state of the application processor module to the data receiving state.

19. The method as disclosed in claim 7, wherein initiate a first detection mechanism when the baseband processor module receives data; and the first detection mechanism comprises the steps of:
- Step e1, receiving a data package by a Secure Digital Input and Output (SDIO) interface;
- Step e2, detecting the data package by the SDIO interface, and then determining the detection result;
- if the data package has errors, then shift to Step e3;
- if the data package does has no error, then shift to Step e4;
- Step e3, the baseband processor module dropping the data package which has errors, and then returning to Step e1;
- Step e4, determining whether the data package is the last data package in the data receiving process by the SDIO interface;
- if the data package is the last data package in the data receiving process, then exiting; and
- if the data package is not the last data package in the data receiving process, then return to Step e1.

20. The method as disclosed in claim 19, wherein in Step e4, the SDIO interface sends a first resend signal to the application processor module, the first resend signal requests the application processor module to resend the data package which has errors;
- the application processor module resends the corresponding data package to the baseband processor module after the application processor module has received the first resend signal.

21. The method as disclosed in claim 17, wherein initiate a second detection mechanism when the application processor module receives the data; and the second detection mechanism comprises the steps of:
- Step f1, receiving a data package by the application processor module;
- Step f2, detecting the data package by the application processor module, and then determining the detected result;
- if the data package has errors, then shift to Step f3;
- if the data package has no error, then shift to Step f5;
- Step f3, sending a second resend signal from the application processor module to the baseband processor module;
- Step f4, resending the data package which has errors to the application processor module after the baseband processor module has received the second resend signal; and then returns to Step f1;
- Step f5, determining whether the data package is the last package in the data transmission process by the application processor module;
- if the data package is the last data package in the data receiving process, then exiting; and
- if the data package is not the last data package in the data receiving process, then returns to Step f1.

\* \* \* \* \*